United States Patent [19]
Söderberg et al.

[11] 4,323,274
[45] Apr. 6, 1982

[54] REAR FOR A PASSENGER CAR

[75] Inventors: Richard Söderberg, Möglingen; Steven Winter, Hemmingen; Hermann Burst, Rutesheim, all of Fed. Rep. of Germany

[73] Assignee: Dr. Ing. h.c.F. Porsche Aktiengesellschaft, Stuttgart, Fed. Rep. of Germany

[21] Appl. No.: 144,276

[22] Filed: Apr. 28, 1980

[30] Foreign Application Priority Data

Apr. 27, 1979 [DE] Fed. Rep. of Germany ... 7912264[U]

[51] Int. Cl.³ .............................................. B62D 37/02
[52] U.S. Cl. ...................................... 296/1 S; 296/76; D12/181
[58] Field of Search .................. 296/1 S, 76; D12/181

[56] References Cited
PUBLICATIONS

Motor Trend, Nov. 1978, p. 4.
Road & Track, Feb. 1979, p. 70.

*Primary Examiner*—Robert R. Song
*Attorney, Agent, or Firm*—Craig and Antonelli

[57] ABSTRACT

A rear for passenger automobiles of the type having a pivotal hatch inserted in a rear opening of a vehicle body and extending in a smooth flowing line toward the rear and including a window in a transversely extending lower frame adjoining the window, is provided, in accordance with the preferred embodiment of the invention, with an aerodynamic device on the lower frame of the hatch, the aerodynamic device having sections extended laterally from the hatch along lateral body parts of the vehicle. The laterally extended sections should preferably merge into and terminate at the lateral body parts. Additionally, in hatches where frames are provided extending in the longitudinal direction of the vehicle, ribs are provided extending away from the aerodynamic device, running along the frames, and forming an aerodynamic unit with the aerodynamic device. The ribs preferably taper in height in the direction away from the aerodynamic device so as to merge into and terminate near upper ends of the longitudinally directed frames of the hatch.

4 Claims, 2 Drawing Figures

REAR FOR A PASSENGER CAR

BACKGROUND AND SUMMARY OF THE INVENTION

The invention relates to a rear for passenger automobiles with a pivotable hatch inserted in an opening of the body, which latter extends in a smoothly flowing line toward the rear, this hatch comprising a window. The lower frame of the hatch, extending transversely and adjoining the window, is delimited by lateral body parts extending obliquely to the driving direction.

In a conventional rear of a passenger car, the air flow is disrupted at a relatively early point, whereby the drag is increased.

Therefore, it is an object of the invention to provide the rear of a passenger car with a device, by means of which the drag coefficient can be lowered.

According to a preferred embodiment of the invention, this object has been attained by providing, in a manner known per se, an aerodynamic device at the frame, this device exhibiting sections which are extended laterally past the hatch and run along the lateral body parts. In this connection, it is advantageous to attach the sections to the lateral body parts. If the hatch comprises frames extending in the longitudinal direction of the vehicle, it is advantageous to provide ribs which extend along the frames away from the device. If the aerodynamic device is constituted by an elastic member, it is advantageous to equip the elastic member with a recess on the side facing the frame, this recess being delimited at least along certain sections by a bracket holding the member, wherein the bracket is provided with a holding fixture serving for mounting the device to the frame. For this purpose, the holding fixture is made of a hat-shaped profile in cross section. Besides, the member comprises crosspieces arranged at an angle to each other, the ends of these crosspieces resting on the window or on the frame under pretensioning.

Among the principal advantages attained by means of the invention are to be seen in that an early disruption of the air stream is prevented by the configuration of the aerodynamic device, with the result that the drag coefficient is reduced. The device has a simple construction and can be attached to the body without any problems, even if retrofitted, the crosspieces ensuring a satisfactory connection with the adjacent body parts.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
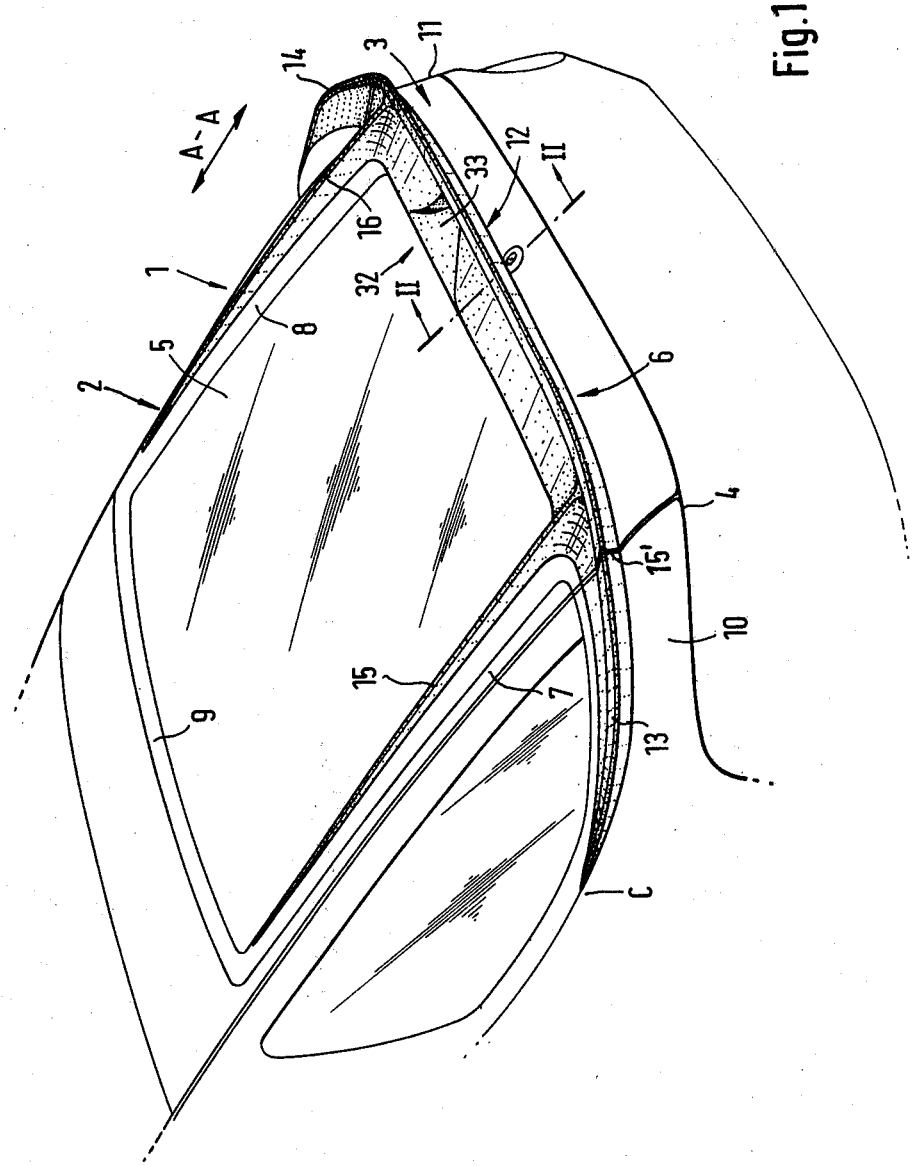
FIG. 1 shows an oblique view of a rear of a passenger automobile.

The passenger car 1 comprises, in the illustrated area, a body 2 with a pivotable hatch 3 articulated to the body by hinges, not shown. The hatch 3 is inserted in an opening 4 of the body 2 and comprises a window 5. The window 5 is delimited by a lower frame 6 extending at right angles to the longitudinal extension A—A of the vehicle, two frames 7, 8 extending in the longitudinal extension A—A of the vehicle, and an upper transverse frame 9. Lateral body parts 10, 11 bound the lower frame 6 so as to define a continuous external contour therewith and extend obliquely to the driving direction A—A.

To prevent the air stream from being prematurely disrupted during driving, an aerodynamic device 12 is provided at the lower frame 6 of the hatch 3, this device exhibiting sections 13, 14 extended laterally past the hatch 3 and running along the lateral body parts 10, 11. The sections 13, 14 are mounted to the lateral body parts and are constructed of decreasing height so as to merge into and terminate at body parts 10, 11. A joint 15' is provided between the sections 13, 14 and the device 12 extending in the zone of the hatch 3.

Figure 2:
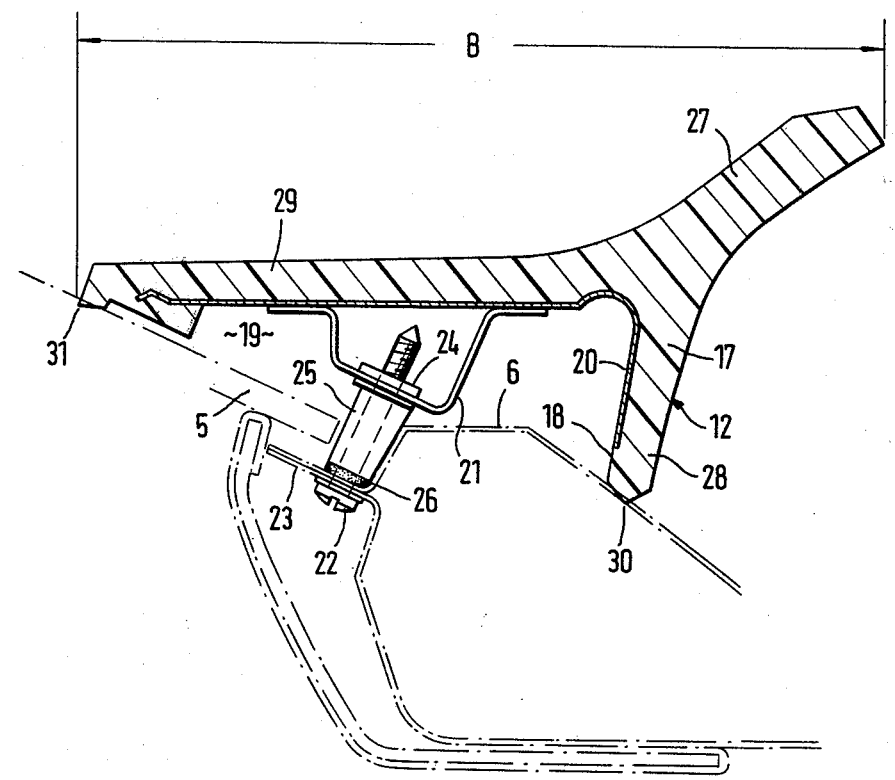
FIG. 2 shows a section along line II—II of FIG. 1 on an enlarged scale.

The length B of the device 12 is approximately constant across the width of the hatch 3 (FIG. 2). In the zone of sections 13, 14, the length is continuously reduced, terminating at a point C at each side of the vehicle.

Ribs 15, 16 are provided along the frames 7, 8. These ribs extend away from the device 12, but form a unit therewith. As shown, the ribs decrease in height as they proceed away from device 12 and merge into and terminate near the upper ends of the frames 7, 8.

According to FIG. 2, the device 12 is constituted by an elastic member 17 of foam material, comprising a recess 18 on the side facing the lower frame in such a way that a cavity 19 is produced between the frame 6 and the member 17 for weight reduction purposes. The recess 18 is defined by an angular, relatively thin-walled bracket 20, made of metal, for example. The bracket 20 is preferably joined to the member 17 by incorporation into its material and provided with a holding fixture 21 of a hat-shaped profile (i.e., a body portion having an open end with a flange portion thereat).

The holding fixture 21 serves for mounting the device 12 to the frame 6. For this purpose, a screw 22 penetrates an opening of a flange 23 of the frame 6 and cooperates with a nut 24 attached to the holding fixture 21. Between the holding fixture 21 and the flange 23 a spacer element 25 is provided. An elastic disk 26 can optionally be arranged between the spacer element 25 and the flange 23.

The mounting of sections 13, 14 to the lateral parts 10, 11 takes place in a comparable way.

The member 17 has a guide section 27 projecting obliquely upwardly toward the rear and crosspieces 28, 29 arranged at a mutual angle. The ends 30, 31 of the crosspieces 28, 29 rest under pretensioning on the frame 6 and on the window 5, respectively.

At 32, a molded portion 33 is provided for a shaft of a windshield wiper, not shown. At this location, a drain hole can also be arranged, which is likewise omitted from the drawing.

While we have shown and described one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

We claim:

1. Rear for passenger automobiles comprising a pivotable hatch inserted in an opening of a vehicle body, said body extending in a smoothly flowing line toward the rear, said hatch including a window, a transversely extending lower frame of the hatch, adjoining tthe window, being bounded by lateral body parts extending obliquely to the driving direction, characterized in that an aerodynamic device is provided on the lower frame of the hatch, said device having sections extended laterally from the hatch along the lateral body parts, wherein the aerodynamic device is comprised of an elastic member, wherein the elastic member has a recess on a side facing the lower frame of the hatch, this recess being delimited at least along certain sections by a bracket, said bracket being provided with a holding fixture serving for attaching the aerodynamic device to the lower frame, characterized in that the holding fixture has a generally hat-shaped profile in cross section.

2. Rear for passenger automobiles comprising a pivotable hatch inserted in an opening of a vehicle body, said body extending in a smoothly flowing line toward the rear, said hatch including a window, a transversely extending lower frame of the hatch, adjoining the window, being bounded by lateral body parts extending obliquely to the driving direction, characterized in that an aerodynamic device is provided on the lower frame of the hatch, said device having sections extended laterally from the hatch along the lateral body parts, wherein the aerodynamic device is comprised of an elastic member, wherein the elastic member has a recess on a side facing the lower frame of the hatch, this recess being delimited at least along certain sections by a bracket, said bracket being provided with a holding fixture serving for attaching the aerodynamic device to the lower frame, characterized in that the elastic member comprises crosspieces arranged at an angle with respect to each other, ends of these crosspieces resting on one of the window and the lower frame, respectively.

3. Rear according to claim 2, wherein said bracket is incorporated into the material of said crosspieces.

4. Rear according to claim 2, wherein an air guide section forming part of said aerodynamic device projects rearwardly in an obliquely upward direction from a junction of said cross pieces.

* * * * *